Inventors
VICTOR V. VACQUIER
GARY MUFFLY

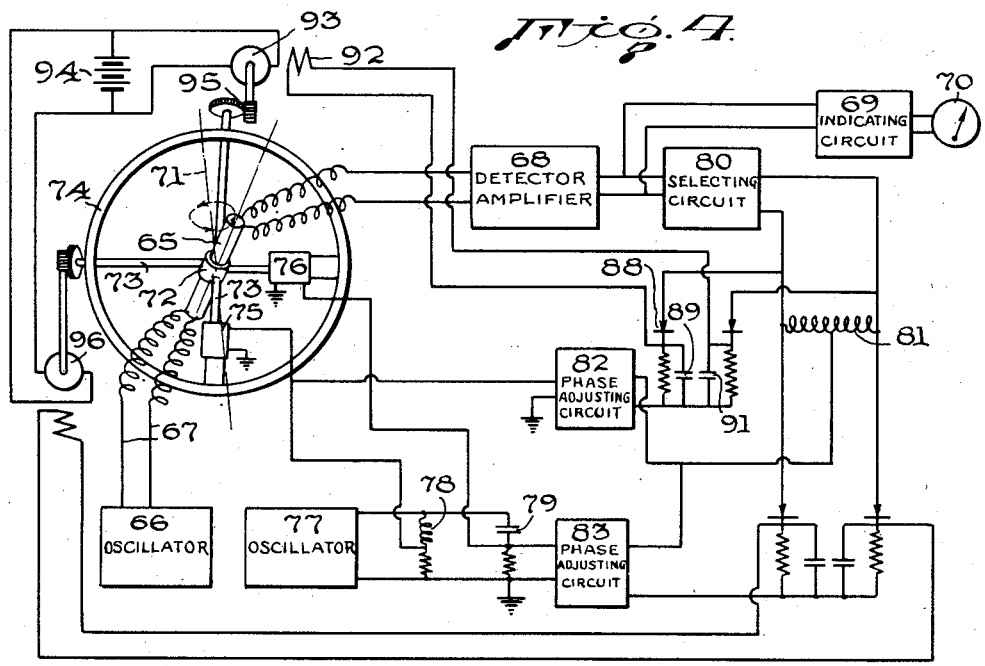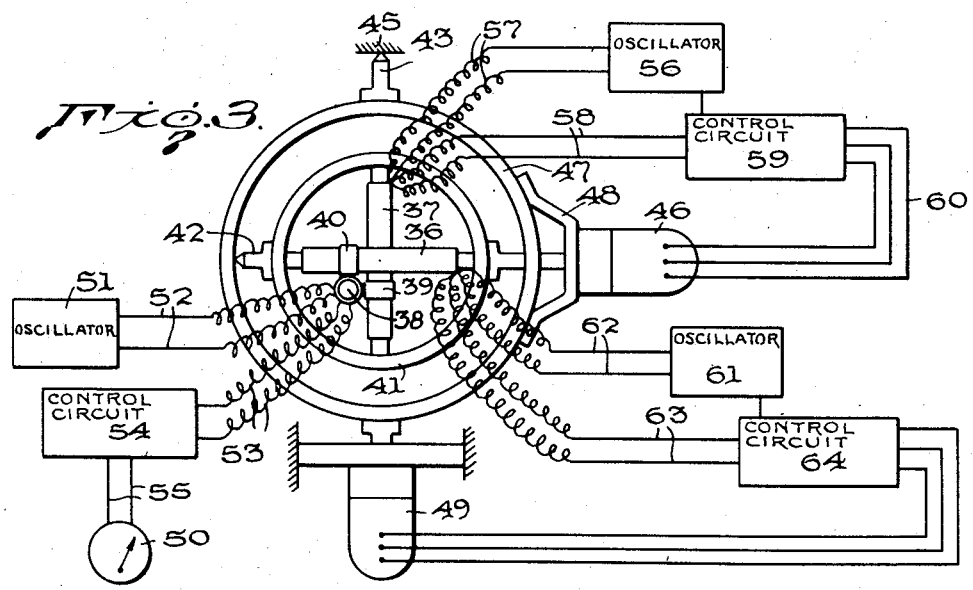

Patented May 29, 1951

2,555,209

UNITED STATES PATENT OFFICE 2,555,209

METHOD AND APPARATUS FOR MEASURING THE VALUES OF MAGNETIC FIELDS

Victor V. Vacquier, Garden City, N. Y., and Gary Muffly, Penn Township, Allegheny County, Pa., assignors to Gulf Research & Development Company, Pittsburgh, Pa., a corporation of Delaware Application November 1, 1943, Serial No. 508,550

13 Claims. (Cl. 175—183)

The present invention relates to a method and apparatus for measuring the values of magnetic field, these being the total magnetic field, and its time and space changes.

More particularly the invention provides a stabilized support for a magnetically sensitive detector which is automatically oriented with respect to the earth's magnetic field regardless of changes in its position, so that usable electric signals will be produced on small changes in local magnetic field, for example by the presence of submarines, ships and military mines, without interference from spurious signals which otherwise would be produced by varying angular displacements of the detector with respect to the ambient field.

Although the apparatus is not limited in its application but, rather, is adaptable to many uses involving the investigation of magnetic field it has been found especially suitable and highly efficient in the detection of submarines from aircraft. But here, as when it is mounted in other vehicles, a stabilized support must be provided, for even small angular motions will introduce large disturbances into the readings because of variation of projection of the earth's magnetic vector on the axis of the instrument.

In the application of Victor Vacquier, Serial No. 403,455, now Patent No. 2,406,870, there is disclosed an apparatus responding to magnetic fields wherein a detecting magnetometer may be oriented in the direction of maximum field intensity by means of an orienting magnetometer which, itself, is sensitive to deviations in position and which controls a servo-motor or the like operating to restore the detector to oriented position.

The present invention has the same general purpose which is achieved in various ways, as for example by mounting the detecting and orienting magnetometers on a gyroscope which holds the detector properly inclined with respect to the horizontal so that it is pointed correctly when the orienting magnetometer reaches the balance point; or by eliminating the gyroscope with the attending complicating factor of precession which it introduces and, instead, employing mutually perpendicular magnetometers for orienting the instrument in both horizontal and vertical directions through control of servo-motors which cause compensation for deviations; or by employing a single magnetometer which is wobbled in an orbital path about an average axis in such manner that modulation of the output caused by deviation in position effects restoration to maintain the magnetometer along the line of the earth's total intensity, the same magnetometer in such case serving as a detector; all as will be described more fully hereinafter.

In use of magnetically responsive instruments of the type with which the present invention is concerned there is manifest need for stabilizing the detector along the direction of the earth's magnetic field. Where such instrument is employed in submarine detection from aircraft, for example, the requirement that the support for the instrument be stabilized and maintained in oriented position is particularly apparent. At a distance of three hundred feet a submarine of average tonnage will distort the earth's magnetic field by 30 gamma, while the total value of the earth's field is 60,000 gamma (1 gamma=$10^{-5}$ Gauss). In order to detect the slight distortion caused by the proximity of such a mass it is necessary to direct the magnetically sensitive detector along the earth's field thereby to reduce the magnitude of spurious signals; otherwise these would obscure the response indicating the presence and location of the submarine. If the detector were perpendicular to the earth's field and were tilted one degree, it would give a signal of 1000 gamma, whereas if it were directed along the earth's field, a tilt of one degree would generate a spurious signal of only 8 gamma. The present invention affords a stabilized support which maintains the magnetically sensitive detector directed in the line of the earth's field within two-tenths of one degree, as a result of which the instrument is highly sensitive and free from error in its indications.

A principal object of the invention, therefore, is automatically to orient a magnetometer along the earth's total intensity.

Another object of the invention is to provide an apparatus for measuring the values of magnetic field wherein a detecting magnetometer is automatically aligned in the direction of the earth's magnetic field by means responding to deviation from its oriented position.

Still another object of the invention is to provide apparatus for measuring the values of magnetic field wherein a detecting magnetometer is stabilized and oriented in space by means which is energized to restore the position of the same when its displacement with respect to the earth's magnetic field causes angular deviation of axes which are mutually perpendicular to the axis of such detector.

A further object of the invention is to provide apparatus for measuring the value of magnetic field, which apparatus is stabilized in the direction of the earth's magnetic field and in alignment therewith by means of a magnetometer to which orbital movement is imparted for continuously sampling the field about an average axis in alignment with the earth's field, but upon deviation of such axis producing a modulated response which controls restoring means.

A still further object of the invention is to provide a method for stabilizing a magnetometer and orienting it in the earth's magnetic field through the medium of associated magnetically sensitive means which upon deviation acts to restore the magnetometer in alignment with the earth's magnetic field.

Still another object of the invention is to make application of the principles of this invention to apparatus other than for magnetic detection, such for example, as acoustic, radio and other types of detectors.

Other and further objects and advantages of the invention will be apparent from the following description and drawings wherein:

Figure 3 is a partly diagrammatic view wherein three magnetometers are arranged in mutually perpendicular relation, two of which control the operation of servo-motors for maintaining the sensitive axis of these elements in the plane of the magnetic horizon whereby the third magnetometer is maintained in alignment with the earth's total field.

Figure 4 is a partly diagrammatic view of a modification which embodies a wobbling magnetometer for correcting deviation from oriented position as well as for indicating the values of applied magnetic field.

Figure 5 is a vector diagram showing the combination of voltages derived in the system of Figure 4.

Figure 1:
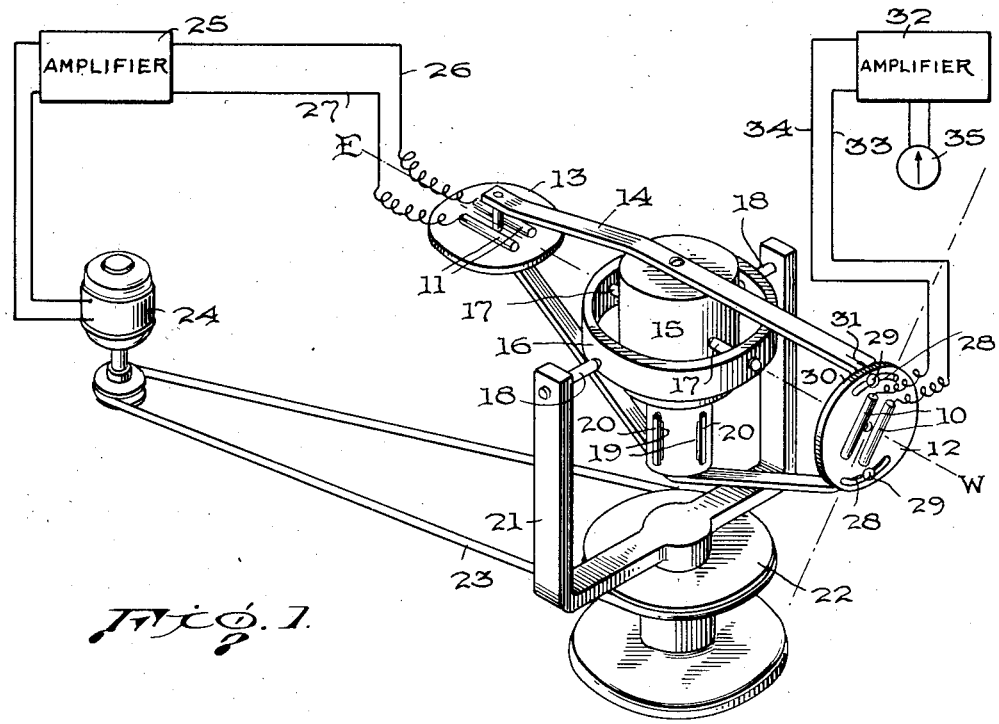
Figure 1 is a perspective view of one form of the invention wherein the detecting magnetometer is mounted upon a gyro-stabilized framework and is oriented in horizontal plane by a similar magnetometer associated therewith.
Figure 2:
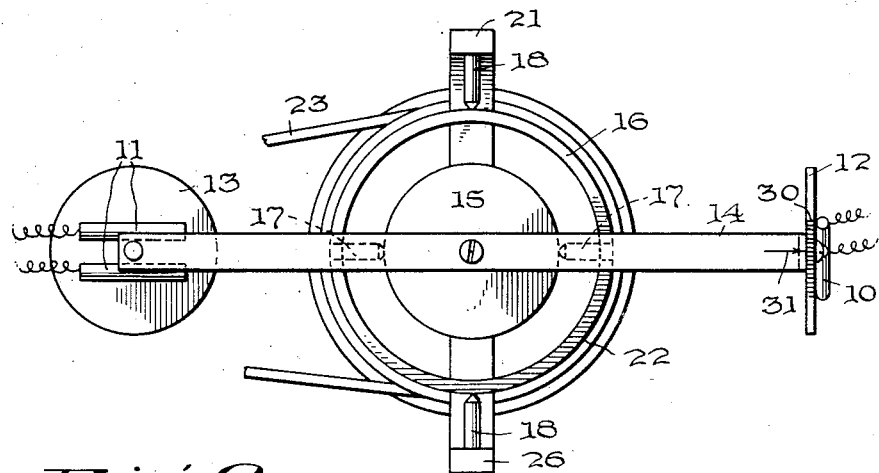
Figure 2 is a fragmentary plan view of the instrument shown in Figure 1.

The magnetometers 10 and 11 are constructed and connected in circuit after the manner described in the aforesaid application Serial No. 403,455. Since the particular circuit employed for exhibiting response to changing magnetic forces does not constitute a part of the present invention it will suffice briefly to explain that each of the magnetometers 10 and 11 comprises a pair of cores of high magnetic permeability in which voltages are induced by oppositely wound coils to which a periodically varying voltage is supplied, giving rise in secondary windings of the cores to sharp voltage pulses which in zero field cancel each other out, but produce a greatly distorted impulse when unbalance occurs.

The magnetometers are mounted on a pivoted support, the arrangement being such that when the parallel cores of the orienting magnetometer 11 extend at right angles to the earth's magnetic field, say in an east-west direction the cores of detecting magnetometer 10 will be aligned with the field in north-south direction. The orienter 11 is, thus, in zero field and the voltages induced therein mutually cancel each other out, or substantially so, whereupon sharp peaks of output signal disappear. However, unbalance which is caused if the orienter moves from the assumed east-west direction causes positive or negative peaks to occur according to the direction of deviation and these are utilized to control a reversing motor, acting to restore the orienter 11 to zero field and thereby maintaining the cores of detector 10 in a position extending along the earth's magnetic field. As so oriented the detecting magnetometer 10 responds to the ambient field and in normal operation is subjected to compensating magnetic force which is a little less or a little more than is required to buck out the earth's field exactly. The detector is thus rendered more sensitive than it would be if operated at the exact balance point, and it has the additional advantage that discrimination is provided between increases and decreases of field.

As shown in Figure 1, a detecting magnetometer 10 and an orienting magnetometer 11 (both of which are magnetically sensitive detectors of similar construction) are mounted on discs 12 and 13, respectively, at the ends of a frame 14. The frame is rigidly attached to the gyroscope 15 and extends laterally thereof in a plane determined by the vertical gyroscope axis and the inner gimbal axis 17.

The gyroscope is of well-known construction, conveniently of turbine type driven by air which is admitted from a source, not shown, through passages in the gimbal ring 16 and pivots 17, 18, being subsequently expelled through radial ports 19, past obturating pendulous vanes 20. The gyroscope maintains its spin axis vertical, but it is deflected slightly when subjected to horizontal accelerations such as occur when the airplane turns.

The pivots 18 support the gyroscope assembly in a U-shaped bracket 21 which is carried by a turntable 22 for turning the instrument bodily, through the medium of belt gearing 23 and reversing motor 24. Thus, with the parallel cores of the orienting magnetometer 11 oriented along an east-west line which passes through the pivots 17 and intersects the vertical axis of the gyroscope, any deviation to north or south of this line causes unbalance in the induced voltages of the cores and a resulting sharp impulse which is transmitted to amplifier 25 through circuit connections 26 and 27, the amplifier in turn responding in such manner that when the outer extremity of the orienter 11 is north of east-west line along which it is normally directed, the motor 24 turns the frame 21 clockwise until normal direction is restored, whereas if it is south of this line, the rotation to bring it back to position is counterclockwise. In this manner the magnetometer 11 is at all times oriented in east-west direction and since it is fixed by the bracket mounting at right angles to the detector 10, the latter will be automatically maintained along the earth's total magnetic intensity.

Disc 12 which mounts the detector 10 is formed with one or more arcuate slots 28 through which setscrews 29 project to secure the disc in any adjusted position within the confines of the slots and to support the same on bracket 14 for limited rotation about an axis passing through the gyroscope axis and the gimbal pivots 17. Graduations 30 on the periphery of the disc 12 serve to locate the angular position of the detector 10 with respect to a reference mark 31 on the bracket 14. By adjustment of disc 12 the detector is made to assume an angle which is the complement of the angle of magnetic dip in the locality where observations are taken.

The detecting magnetometer 10 is of the same construction as the orienting magnetometer 11 previously described. The applied field is added to the field of one core and is subtracted from the field of the other since in each energization cycle the cores are magnetized in opposite senses. The corresponding flux changes give rise to voltage changes in the secondary windings, one of which leads the other slightly in time; that is, there is a phase shift or displacement between the impulses which are qualitatively the same although opposed. The net signal impulse obtained by subtracting one from the other is in the form of a wave which has a sharp peak for each energization cycle. As the ambient field changes or is distorted by the presence of extraneous magnetic bodies the wave amplitude is observed to change rapidly, thereby serving for detection or measurement.

The form of apparatus shown in Figure 3 is useful in avoiding the forces of precession encountered in the use of a gyroscope for stabilizing the instrument. Here three mutually perpendicular magnetometers 36, 37 and 38 operating in the same manner as those previously described, are secured by clamps 39 and 40 within a gimbal ring 41, the magnetometer 36 being aligned with pivot 42, and magnetometer 37 being similarly aligned with pivot 43 which engages a fixed supporting surface 45.

The inner gimbal ring 41 is rotated to adjusted position by a reversing motor 46 mounted on the outer ring 47 by bracket 48 and having its shaft attached to the inner ring 41. Similarly, the outer ring is moved about its pivot 43 by a reversing motor 49 the shaft of which is attached to such ring.

The magnetometer unit 38 is the element here used for indication on the meter 50 and consequently functions as the detector. An oscillator 51 supplies energizing current to it through conductors 52, and the opposing impulses derived in the secondary windings pass through conductors 53 to a detecting and amplifying circuit 54 having connections through lines 55 with the meter, as disclosed in the aforesaid Vacquier patent.

The orienting magnetometer 37 servo-controls itself about an axis passing through the pivot 42, by means of an oscillator 56 which has connection with the primary winding of the element through conductors 57, the opposing impulses of the secondary windings being taken off through conductors 58 to the detector and amplifier 59 for control of the reversing motor 46 through connections 60.

The second orienting magnetometer 36 also servo-controls itself into neutral magnetic plane by means of oscillator 61 connected as at 62 to the primary windings of the unit from which the induced voltages pass through connections 63 to the detector-amplifier control circuit 64 which directs the operation of reversing motor 49. Instead of the flexible connections 52—53, 57—58 and 62—63, shown in the drawings, slip rings may be used to connect to the moving parts on the gimbal system. The oscillators 51, 56 and 61 may be operated to supply current of the same or different frequencies or phases to the magnetometer units. The motors 46 and 49 should be arranged for minimum magnetic disturbance at the coils, to which end they may be mounted at a distance with flexible shafts, belts or the like for driving the gimbal rings.

In operation of the invention as so embodied, displacement of the detector 38 causes deviation of the axes of the orienters 36 and 37 whereupon one or both of the latter will produce impulses which, through the respective control circuits cause the motors 46 and 49 to rotate the gimbal ring assemblage in directions about the mutually perpendicular axes to restore them to balance in zero field. In this manner the detector 38 is maintained in alignment with the earth's magnetic field and is stabilized in both horizontal and vertical directions.

A further modification of the invention, achieving the same result, is shown in Figure 4 wherein a single magnetometer 65 is used for the dual purpose of detecting the proximity of magnetic bodies as well as for orienting and stabilizing the apparatus. The magnetometer 65 is of the construction previously described, supplied with current from an oscillator 66 through flexible conductors 67, and transmitting impulses to a detector-amplifier circuit 68, thence to an indicator circuit 69 and an indicating instrument 70.

The magnetometer 65 is mounted at a fixed angle to an axis 71 parallel to the earth's field but is wobbled continuously so that a point at one end thereof describes a circular orbit about that axis, as indicated by dotted lines. This wobbling is accomplished by clamping the unit at its mid-point, as by sleeve 72, the clamp having connection with flexible rods 73 which support the coil within ring 74 mounted in a plane roughly perpendicular to the earth's field. Twister-type Rochelle salt crystals 75 and 76 impart motion to the rods which causes the magnetometer unit to be wobbled. The electrical energy for driving the crystals is obtained from oscillator 77 and phase shifting elements, as will be described. Each crystal imparts a twist to its respective support rod 73 and sets up a component of vibration about the rod as an axis. If the two vibrations are imparted at the same frequency but ninety degrees out of phase, a nutating motion will be imparted to the magnetometer and in consequence of this motion its end will describe a circular orbit. Thus, the coil sweeps out a slender cone and samples the magnetic field in all directions from its average position, namely along the line of the earth's field. So long as this average position is maintained the magnetometer makes a constant angle with the earth's field (shown exaggerated in Figure 4) and gives an indication of constant amplitude. However, as soon as the average position shifts away from alignment with the field, the output is modulated or varied because the magnetometer then makes different angles with the field in different parts of its orbit. The phase of the modulation with respect to the orbit phase indicates the direction of deviation of the average position, and the amplitude of modulation indicates the amount of such deviation. By using phase-discriminating circuits, as will be shown, the modulation may be resolved into two restoring components which control the operation of servo-motors to bring the average axis back into line.

The frequency of current supplied to the crystals 75 and 76 is preferably a few cycles per second, faster than the magnetic fluctuations to be detected, but much slower than the exciting frequency from oscillator 66. The circuit of oscillator 77 includes an inductor 78 to provide a lag, and condenser 79 a lead in the exciting currents to make up the required ninety degrees of phase shift for circular vibration. In order to obtain good deflection with minimum driving force the respective supporting rods 73 may be made mechanically resonant to the vibration frequency, provided the angular vibration of the magnetometer does not thereby exceed the safe angular twist of the crystal.

When the magnetometer gets out of line with the field, modulation of the output occurs at the orbit frequency. This modulation is picked up from circuit 68 by a modulation-detecting or selecting circuit 80 the output of which, of fairly high level, passes to a coil 81 or other dividing means that will give two voltages 180 degrees out of phase for the use of a phase discriminating circuit of known type. The two voltages from coil 81 are each combined with two other voltages of the same frequency obtained through phase adjusting circuits 82 and 83 from the oscillator 77 that vibrates the detector coil 65. The combination of these voltages is best understood by reference to the vector diagram of Figure 5 wherein 84 and 85 represent the two opposed voltages obtained from coil 81. Vector 86 is the voltage obtained from phase adjuster 82 and oscillator 77. This vector may be made to point in any direction by proper choice of the phase-shifting devices. As shown, 84 and 86 combine vectorially as voltage 87. This voltage would be imposed on rectifier 88 (Figure 4) and appear as a proportional D. C. voltage across condenser 89. Likewise, vectors 85 and 86 combine to produce voltage 90 and a corresponding D. C. voltage across condenser 91 (Figure 4). It can be seen that 87 is greater than 90 and that the two corresponding D. C. voltages combine in opposition to energize field 92 of a D. C. motor 93, the armature of which is constantly excited by battery 94. Because of this constant excitation the motor will run in a predetermined direction and through suitable reduction gearing 95 will twist the support rod 73 with which it connects and shift the direction of the average axis of magnetometer 65. The motor must be phased so that the shift will be in the proper direction to restore the magnetometer to normal, and the phase-adjusting circuit 82 must be set so that the vector 86 will be perpendicular to vectors 84 and 85 in Figure 5 when motor 93 reaches the optimum magnetometer position with respect to its axis. When this occurs the motor will be cut off, vectors 87 and 90 having become equal.

Restoration of the magnetometer with respect to the other component at right angles to that described is performed in the same way by motor 96 which is energized by a circuit which is the duplicate of that for control of the motor 93. The phase of the voltage from network 83 when properly adjusted is ninety degrees from the phase of that from network 82. The amount of shift required in these two networks depends upon mechanical phase shifts in the vibrating arrangements and electrical phase shifts, particularly in the unit 80.

While the invention as above described is particularly useful in magnetic detection, it is applicable, as well, to other types of influence as, for example, wherein the detectors of Figures 3 and 4 are replaced by directional microphones or antennas. Electrical circuits may be changed in conventional manner to handle received energy in such adaptations. Thus, in sound work the microphone may be made to track the source and in the radio field the device may serve as an automatic radio-compass of three-dimensional character, useful in locating airplanes or landing fields. Similarly, in illumination or radiation studies the direction of source and intensity may be readily determined.

From the foregoing it will be understood that our invention embodies a stabilized support which is automatically oriented to direct a detecting magnetometer along the earth's total intensity, and which maintains its position in space regardless of deviations in the direction of movement or the relative angular position of the vehicle or other supporting surface upon which it is mounted.

What we claim is:

1. Apparatus for measuring values of magnetic field comprising a magnetically sensitive detector, a gravity-controlled gyroscope seeking to align its spin axis along the vertical and having a frame attached thereto for mounting said detector, a gimbal ring mounting for said gyroscope and detector, and a second magnetically sensitive detector mounted on said frame in a plane perpendicular to the axis of said gyroscope, a servo-motor energized by said second detector upon deviation thereof from a normal to the magnetic field to restore position in horizontal plane and orient the apparatus in azimuth, and adjusting means associated with said first detector for inclining the same to the axis of the gyroscope by the complement of the angle of magnetic dip in the locality where observations are made.

2. The method of measuring intensity values of a magnetic field which comprises orienting the magnetic measuring means in a predetermined direction, maintaining said orientation by stabilizing the magnetic measuring means in one plane and simultaneously stabilizing the magnetic measuring means in a second plane and controlling both of said stabilizations by means sensitive to orientation in the magnetic field, and substantially continuously observing the indication of the magnetic intensity measuring means.

3. Apparatus for measuring magnetic field strength and adapted to be used on a moving and tilting conveyance comprising a directionally sensitive magnetic intensity measuring means aligned substantially in the direction of the total magnetic vector and mounted in a universal support and adapted to be oriented about two axes, stabilizing means connected to said support and to said magnetic intensity measuring means and adapted to rotate the latter about one of said axes, separate stabilizing means connected to said support and to said magnetic intensity measuring means and adapted to rotate the latter about the other of said axes, means for detecting deviation of the magnetic intensity measuring means from alignment with the total magnetic vector and for actuating at least one of said stabilizing means, and means connected to said magnetic intensity measuring means indicating the output thereof.

4. Apparatus for measuring a magnetic field strength component which makes a predetermined angle with the magnetic vector and adapted to be used on a moving and tilting conveyance comprising a directionally sensitive flux-valve magnetic intensity measuring means mounted in a universal support and adapted to be oriented about two axes, stabilizing means connected to said support and to said magnetic intensity measuring means and adapted to rotate the latter about one of said axes, separate stabilizing means connected to said support and to said magnetic intensity measuring means and adapted to rotate the latter about the other of said axes, means responsive to deviations of the magnetic intensity measuring means from the desired orientation about one of said axes actuating at least one of said stabilizing means, and means connected to said magnetic intensity measuring means indicating the output thereof.

5. Apparatus for measuring a magnetic field strength component which makes a predetermined angle with the magnetic vector and adapted to be used on a moving and tilting conveyance comprising a directionally sensitive flux-valve magnetic intensity measuring means mounted in a universal support and adapted to be oriented about two axes, stabilizing means connected to said support and to said magnetic intensity measuring means and adapted to rotate the latter about one of said axes, separate stabilizing means connected to said support and to said magnetic intensity measuring means and adapted to rotate the latter about the other of said axes, means responsive to deviations of the magnetic intensity measuring means from the desired magnetic orientation actuating at least one of said stabilizing means, and means connected to said magnetic intensity measuring means indicating the output thereof.

6. Apparatus for measuring magnetic field strength and adapted to be used on a moving and tilting conveyance comprising a directionally sensitive flux-valve magnetic intensity measuring means aligned substantially in the direction of the total magnetic vector and mounted in a universal support and adapted to be oriented about two axes, stabilizing means connected to said support and to said magnetic intensity measuring means and adapted to rotate the latter about one of said axes, separate stabilizing means connected to said support and to said magnetic intensity measuring means and adapted to rotate the latter about the other of said axes, means responsive to deviations of the magnetic intensity measuring means from the desired orientation about one of said axes actuating at least one of said stabilizing means, and means connected to said magnetic intensity measuring means indicating the output thereof.

7. Apparatus for measuring a magnetic field strength component which makes a predetermined angle with the magnetic vector and adapted to be used on a moving and tilting conveyance comprising a directionally sensitive magnetic intensity measuring means mounted in a universal support and adapted to be oriented about two axes, stabilizing means connected to said support and to said magnetic intensity measuring means and adapted to rotate the latter about one of said axes, means responsive to deviations of the magnetic intensity measuring means from the desired magnetic orientation actuating said stabilizing means, separate stabilizing means connected to said support and to said magnetic intensity measuring means and adapted to rotate the latter about the other of said axes, separate means responsive to deviations of the magnetic intensity measuring means from the desired magnetic orientation actuating said second stabilizing means, and means connected to the magnetic intensity measuring means indicating the output thereof.

8. Apparatus for measuring magnetic field strength and adapted to be used on a moving and tilting conveyance comprising a directionally sensitive magnetic intensity measuring means aligned substantially in the direction of the total magnetic vector and mounted in a universal support and adapted to be oriented about two axes, stabilizing means connected to said support and to said magnetic intensity measuring means and adapted to rotate the latter about one of said axes, means for detecting deviations of the magnetic intensity measuring means from alignment with the total magnetic vector actuating said stabilizing means, separate stabilizing means connected to said support and to said magnetic intensity measuring means and adapted to rotate the latter about the other of said axes, separate means for detecting deviations of the magnetic intensity measuring means from alignment with the total magnetic vector actuating said second stabilizing means, and means connected to the magnetic intensity measuring means indicating the output thereof.

9. Apparatus for measuring a magnetic field strength component which makes a predetermined angle with the magnetic vector and adapted to be used on a moving and tilting conveyance comprising a directionally sensitive flux-valve magnetic intensity measuring means mounted in a universal support and adapted to be oriented about two axes, stabilizing means connected to said support and to said magnetic intensity measuring means and adapted to rotate the latter about one of said axes, means responsive to deviations of the magnetic intensity measuring means from the desired orientation about said axis actuating said stabilizing means, separate stabilizing means connected to said support and to said magnetic intensity measuring means and adapted to rotate the latter about the other of said axes, separate means responsive to deviations of the magnetic intensity measuring means from the desired orientation about said second axis actuating said second stabilizing means, and means connected to the magnetic intensity measuring means indicating the output thereof.

10. Apparatus for measuring a magnetic field strength and adapted to be used on a moving and tilting conveyance comprising a directionally sensitive flux-valve magnetic intensity measuring means mounted in a universal support and adapted to be oriented about two axes, stabilizing means connected to said support and to said magnetic intensity measuring means and adapted to rotate the latter about one of said axes, means responsive to deviations of the magnetic intensity measuring means from the desired magnetic orientation actuating said stabilizing means, separate stabilizing means connected to said support and to said magnetic intensity measuring means and adapted to rotate the latter about the other of said axes, separate means responsive to deviations of the magnetic intensity measuring means from the desired magnetic orientation actuating said second stabilizing means, and means connected to the magnetic intensity measuring means indicating the output thereof.

11. A self-orienting total vector magnetic intensity measuring apparatus comprising a directionally sensitive flux-valve magnetic detector, said flux-valve producing a signal output in proportion to the component of the magnetic field along an axis of sensitivity of said flux-valve, means operably connected to said flux-valve for deflecting one part thereof in a small substantially circular orbit whose plane is substantially perpendicular to the flux-valve's axis of sensitivity while maintaining another part thereof relatively stationary, whereby whenever the mean direction of the flux-valve's axis of sensitivity is misaligned with the direction of total vector its signal output periodically fluctuates in synchronism with and in phase relation to said deflection and the amplitude of the fluctuation is in proportion to the degree of misalignment, a flexible support for said flux-valve and its deflecting means, said support permitting orientation of said flux-valve and its deflecting means about two axes of orientation which are substantially perpendicular to said axis of sensitivity, means electrically connected to said flux-valve sensitive to the phase and amplitude of the flux-valve output fluctuations occurring at the frequency of deflection of said flux-valve, means responsive to quadrature components of output of said phase-sensitive means and operably connected to the support and also to the flux-valve and its deflecting means for shifting the orientation of the flux-valve and its deflecting means about the respective axes of orientation to reduce said fluctuations of flux-valve output signal so that the mean direction of the flux-valve's axis of sensitivity is aligned with the direction resulting in maximum average signal output, and means connected to said flux-valve for indicating the output thereof.

12. Apparatus for measuring magnetic field strength and adapted to be used on a moving and tilting support comprising a directionally sensitive magnetic detector producing a signal output in proportion to the component of the magnetic field along the detector's axis of sensitivity, a support for said detector permitting orientation thereof about two axes for aligning said detector with the magnetic vector, said axes being substantially perpendicular to the detector's axis of sensitivity and to each other, an indicator connected to said detector and responsive to changes in the average output of said detector, two vibrating means operably connected to said support and to said detector for vibrating the latter about said two substantially perpendicular alignment axes respectively and providing a time phase shift of about 90° between the vibrations about said two axes, whereby whenever the mean direction of the detector's axes of sensitivity is misaligned with the direction of the magnetic vector the detector output signal is modulated at the frequency of vibration and in phase relation thereto and the amplitude of said modulation is in proportion to the degree of misalignment, means connected to said detector for detecting the modulation of the output at the frequency of said vibration, two phase discriminators connected to said modulation detector and responsive respectively to quadrature components of the detected modulation, two servo-motors each operably connected to said support and to each detector and electrically connected to and responsive to the output of the respective phase discriminator and each arranged to turn the detector about one of said two mutually perpendicular axes, and means for phasing the phase discriminators from the detector vibrating means so that each phase discriminator will control its servo-motor in the proper sense to urge the detector into an orientation so that the mean direction of its axis of sensitivity is in alignment with the magnetic vector.

13. Apparatus for measuring magnetic field strength and adapted to be used on a moving and tilting support comprising a directionally sensitive detector which produces a signal output in proportion to the component of magnetic field with which it is aligned, flexible supporting rods mounted substantially perpendicular to each other and secured to said detector to maintain the average direction of the axis thereof substantially perpendicular to the axes of said supporting rods, a source of alternating current impulses, twister-type crystals energized by said alternating current impulses and arranged to impart vibrations to said supporting rods substantially in time quadrature, whereby an end of said detector will describe a small circular orbit about its average axis and whereby the detector will undergo the magnetic field component along directions making a small angle with the average direction of the detector's axis and thereby deliver output signal energy modulated at the frequency of vibration whenever the mean direction of the detector's axis is misaligned with the direction of the magnetic vector, means connected to the detector for detecting the modulation of output signals as the detector is vibrated with respect to the magneic field, two phase discriminators connected to said detecting means and responsive respectively to quadrature components of the detected modulation, and two restoring means connected to and responsive to the output of the respective phase discriminator and each restoring means connected to and arranged to twist one of said supporting rods so that the mean direction of the axis of the detector is maintained in alignment with the magnetic vector.

VICTOR V. VACQUIER.
GARY MUFFLY.

REFERENCES CITED

The following references are of record in the file of this patent:

UNITED STATES PATENTS

| Number | Name | Date |
|---|---|---|
| 1,895,373 | Brucke | Jan. 24, 1933 |
| 1,919,982 | Mayer et al. | July 25, 1933 |
| 1,988,521 | Sperry, Jr. | Jan. 22, 1935 |
| 2,016,977 | Thomas | Oct. 8, 1935 |
| 2,027,393 | McCreary | Jan. 14, 1936 |
| 2,047,609 | Antranikian | July 14, 1936 |
| 2,124,825 | Machts et al. | July 26, 1938 |
| 2,213,357 | Barth | Sept. 3, 1940 |
| 2,246,259 | Machts | June 17, 1941 |
| 2,325,365 | Britten | July 27, 1943 |
| 2,412,612 | Godet | Dec. 17, 1946 |
| 2,468,554 | Hull | Apr. 26, 1949 |
| 2,468,968 | Felch et al. | May 3, 1949 |

OTHER REFERENCES

Geophysical Prospecting; Trans. Amer. Instit. of Mining and Metallurgical Engineers, 1932, pages 213–214.

Heiland; Geophysical Exploration, Prentice Hall Inc., New York city, 1940, pages 16, 41 and 357–361.